US012386368B2

United States Patent
Biswas et al.

(10) Patent No.: US 12,386,368 B2
(45) Date of Patent: Aug. 12, 2025

(54) METHODS AND SYSTEMS FOR OPTIMIZED ASSIGNMENT OF TRAVERSAL TASKS UNDER IMPERFECT SENSING OF AUTONOMOUS VEHICLES

(71) Applicant: Tata Consultancy Services Limited, Mumbai (IN)

(72) Inventors: Swagata Biswas, Kolkata (IN); Himadri Sekhar Paul, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 230 days.

(21) Appl. No.: 18/461,337

(22) Filed: Sep. 5, 2023

(65) Prior Publication Data
US 2024/0182069 A1 Jun. 6, 2024

(30) Foreign Application Priority Data
Dec. 1, 2022 (IN) .............................. 202221069383

(51) Int. Cl.
G05D 1/246 (2024.01)
G05D 1/622 (2024.01)

(52) U.S. Cl.
CPC ........... *G05D 1/2465* (2024.01); *G05D 1/622* (2024.01)

(58) Field of Classification Search
None
See application file for complete search history.

(56) References Cited

U.S. PATENT DOCUMENTS

| 9,127,913 B2* | 9/2015 | Neff ........................ F41G 7/343 |
| 10,124,893 B1 | 11/2018 | Aalund et al. |
| 2021/0339741 A1* | 11/2021 | Rezvan Behbahani ...................... B60W 30/0956 |
| 2022/0011776 A1* | 1/2022 | Narang ................. G06F 18/217 |

(Continued)

OTHER PUBLICATIONS

Momtaz, Imran, Md et al., "Hierarchical State Space Checks for Errors in Sensors, Actuators and Control of Nonlinear Systems: Diagnosis and Compensation", Title of the item: IEEE 28th Asian Test Symposium (ATS), Date: 2019, Publisher: IEEE, Link: https://www.researchgate.net/publication/338440786 Hierarchical State Space Checks for Errors in Sensors Actuators Control of Nonlinear Systems Diagnosis and Compensation.

(Continued)

*Primary Examiner* — Ryan Rink
(74) *Attorney, Agent, or Firm* — Finnegan, Henderson, Farabow, Garrett & Dunner, LLP

(57) ABSTRACT

The disclosure relates generally to methods and systems for optimized assignment of traversal tasks under imperfect sensing of autonomous vehicles. Most of the techniques assumes perfect equipment conditions. With the imperfect sensing, most of the optimized assignment and scheduling algorithm may not be effective during actual execution of the tasks. The present disclosure solves the technical problems in the art by providing an analytical model which estimates the basic performance metrics such as an expected travel duration and safety estimation such as collision probability on its path, under imperfect sensing, for optimal assignment of the tasks. An analytical model is integrated with a performance estimator as implemented by the systems of the present disclosure, which tracks, predicts, and alerts on any major deviations from its intended performance of safety parameters.

18 Claims, 8 Drawing Sheets

(56) References Cited

U.S. PATENT DOCUMENTS

| | | | |
|---|---|---|---|
| 2022/0187833 A1* | 6/2022 | Biswas | G06F 9/4881 |
| 2022/0245975 A1 | 8/2022 | Anderson et al. | |
| 2022/0269279 A1* | 8/2022 | Redford | G06N 3/006 |
| 2023/0304827 A1* | 9/2023 | Stuebler | G01C 21/3815 |
| 2024/0127177 A1* | 4/2024 | Wouhaybi | H04W 4/38 |
| 2024/0353531 A1* | 10/2024 | Sniegucki | G01S 7/41 |

OTHER PUBLICATIONS

Wang, Dawei et al., "A Two-Stage Reinforcement Learning Approach for Multi-UAV Collision Avoidance Under Imperfect Sensing", Title of the item: IEEE Robotics and Automation Letters, Date: 2020, Publisher: IEEE, Link: https://www.researchgate.net/publication/339344692 A Two-Stage Reinforcement Learning Approach for Multi-UAV Collision Avoidance Under Imperfect Sensing.

\* cited by examiner

┌─────────────────────────────────────────────────────────────────────────┐
│ Receiving an autonomous vehicle (AV) list having one or more autonomous vehicles │
│ (AVs), a task list having one or more traversal tasks to be performed by the one or │
│ more AVs, one or more sensors installed in each AV of the AV list, a map of a 3- │
│ dimensional (3-D) dynamic environment where each AV to be traversed, and a │
│ statistical error model associated with each sensor installed in each AV, wherein each │
│ traversal task comprises a predefined source location and a predefined destination │
│ location in the 3-D dynamic environment, and the map of the 3-D dynamic │
│ environment comprises one or more obstacles and defines one or more environmental │
│ attributes associated with each obstacle 302 │
└─────────────────────────────────────────────────────────────────────────┘
                                        ↓
┌─────────────────────────────────────────────────────────────────────────┐
│ Configuring a first radius parameter and a second radius parameter, to define a zone │
│ type for each AV with respect to each obstacle, from a zone type list having (i) a red │
│ zone, (ii) a yellow zone, and (iii) a green zone, based on a distance from each obstacle │
│ to each AV 304 │
└─────────────────────────────────────────────────────────────────────────┘
                                        ↓
┌─────────────────────────────────────────────────────────────────────────┐
│ Determining (i) an estimated completion time, and (ii) an estimated collision count, │
│ for each traversal task with respect to each AV, using (i) the statistical error model │
│ associated with each sensor installed in the associated AV, (ii) the one or more │
│ obstacles present during completion of associated traversal task, and (iii) the one or │
│ more environmental attributes associated with each obstacle 306 │
└─────────────────────────────────────────────────────────────────────────┘
                                        ↓
┌─────────────────────────────────────────────────────────────────────────┐
│ Identifying and assigning, a traversal task among the one or more traversal tasks to │
│ each AV, based the estimated completion time and the estimated collision count being │
│ lowest, and removing each traversal task that is assigned from the task list 308 │
└─────────────────────────────────────────────────────────────────────────┘
                                        ↓
                                       (A)

FIG. 3A

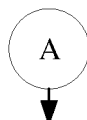

Determining a total completion time, for each AV, as a summation of the estimated completion time of the each of the one or more traversal tasks assigned to the associated AV 310

Assigning the traversal task that is unassigned and present in the task list, to the AV having the total completion time and the estimated collision count being the lowest, and removing each traversal task that is assigned from the task list 312

Performing (i) determining the total completion time for each AV, (ii) assigning the traversal task that is unassigned and present in the task list, to the AV having the total completion time and the estimated collision count being the lowest, and (iii) removing each traversal task that is assigned from the task list, until either each of the one or more traversal tasks are assigned or until the task list is empty 314

Generating an optimized traversal task plan for execution of the one or more traversal tasks by the one or more AVs, based on the assignment of each traversal task to each AV 316

FIG. 3B

METHODS AND SYSTEMS FOR OPTIMIZED ASSIGNMENT OF TRAVERSAL TASKS UNDER IMPERFECT SENSING OF AUTONOMOUS VEHICLES

PRIORITY CLAIM

This U.S. patent application claims priority under 35 U.S.C. § 119 to: Indian Patent Application No. 202221069383, filed on Dec. 1, 2022. The entire contents of the aforementioned application are incorporated herein by reference.

TECHNICAL FIELD

The disclosure herein generally relates to the field of task scheduling, and more specifically to methods and systems for optimized assignment of traversal tasks under imperfect sensing of autonomous vehicles.

BACKGROUND

Industrial automation is driving increasing usage of autonomous vehicles in various application domains including but are not limited to search and rescue operations, manufacturing operations, domestic operation, and logistic operations. However, ensuring reliability and safety while delivering acceptable system performance within the given resource budget is a major concern in automation equipment. Traversal in an unpredictable environment is a basic task performed by the autonomous vehicles.

The state-of-the-art techniques focus on obstacle detection and avoidance for the various autonomous vehicles. Most of the techniques assumes perfect equipment conditions i.e., all associated sensors perform within accepted level of error in reading which is well handled by the sensing devices. However, characterization of the autonomous vehicles under imperfect sensing which may creep-in due to manufacturing defects or aging of the sensing devices, is not fully defined in the state-of-the-art techniques. Due to the imperfect sensing, most of the optimized assignment and scheduling algorithm may not be effective during actual execution of the tasks.

SUMMARY

Embodiments of the present disclosure present technological improvements as solutions to one or more of the above-mentioned technical problems recognized by the inventors in conventional systems.

In an aspect, a processor-implemented method for optimized assignment of traversal tasks under imperfect sensing of autonomous vehicles is provided. The method include the steps of: receiving, an autonomous vehicle (AV) list having one or more autonomous vehicles (AVs), a task list having one or more traversal tasks to be performed by the one or more AVs, one or more sensors installed in each AV of the AV list, a map of a 3-dimensional (3-D) dynamic environment where each AV to be traversed, and a statistical error model associated with each sensor installed in each AV, wherein each traversal task comprises a predefined source location and a predefined destination location in the 3-D dynamic environment, and the map of the 3-D dynamic environment comprises one or more obstacles and defines one or more environmental attributes associated with each obstacle; configuring, a first radius parameter and a second radius parameter, to define a zone type for each AV with respect to each obstacle, from a zone type list having (i) a red zone, (ii) a yellow zone, and (iii) a green zone, based on a distance from each obstacle to each AV; determining, (i) an estimated completion time, and (ii) an estimated collision count, for each traversal task with respect to each AV, using (i) the statistical error model associated with each sensor installed in the associated AV, (ii) the one or more obstacles present during completion of associated traversal task, and (iii) the one or more environmental attributes associated with each obstacle; identifying and assigning, a traversal task among the one or more traversal tasks to each AV, based the estimated completion time and the estimated collision count being lowest, and removing each traversal task that is assigned from the task list; determining, a total completion time, for each AV, as a summation of the estimated completion time of the each of the one or more traversal tasks assigned to the associated AV; assigning, the traversal task that is unassigned and present in the task list, to the AV having the total completion time and the estimated collision count being the lowest, and removing each traversal task that is assigned from the task list; performing, (i) determining the total completion time for each AV, (ii) assigning the traversal task that is unassigned and present in the task list, to the AV having the total completion time and the estimated collision count being the lowest, and (iii) removing each traversal task that is assigned from the task list, until either each of the one or more traversal tasks are assigned or until the task list is empty; and generating, an optimized traversal task plan for execution of the one or more traversal tasks by the one or more AVs, based on the assignment of each traversal task to each AV.

In another aspect, a system for optimized assignment of traversal tasks under imperfect sensing of autonomous vehicles is provided. The system includes: a memory storing instructions; one or more Input/Output (I/O) interfaces; and one or more hardware processors coupled to the memory via the one or more I/O interfaces, wherein the one or more hardware processors are configured by the instructions to: receive an autonomous vehicle (AV) list having one or more autonomous vehicles (AVs), a task list having one or more traversal tasks to be performed by the one or more AVs, one or more sensors installed in each AV of the AV list, a map of a 3-dimensional (3-D) dynamic environment where each AV to be traversed, and a statistical error model associated with each sensor installed in each AV, wherein each traversal task comprises a predefined source location and a predefined destination location in the 3-D dynamic environment, and the map of the 3-D dynamic environment comprises one or more obstacles and defines one or more environmental attributes associated with each obstacle; configure a first radius parameter and a second radius parameter, to define a zone type for each AV with respect to each obstacle, from a zone type list having (i) a red zone, (ii) a yellow zone, and (iii) a green zone, based on a distance from each obstacle to each AV; determine (i) an estimated completion time, and (ii) an estimated collision count, for each traversal task with respect to each AV, using (i) the statistical error model associated with each sensor installed in the associated AV, (ii) the one or more obstacles present during completion of associated traversal task, and (iii) the one or more environmental attributes associated with each obstacle; identify and assign, via the one or more hardware processors, a traversal task among the one or more traversal tasks to each AV, based the estimated completion time and the estimated collision count being lowest, and removing each traversal task that is assigned from the task list; determine a total completion time, for each AV, as a summation of the estimated completion time of the each of the one or more traversal tasks assigned to the associated AV; assign the traversal task that is unassigned and present in the task list, to the AV having the total completion time and the estimated collision count being the lowest, and removing each traversal task that is assigned from the task list; perform (i) determining the total completion time for each AV, (ii) assigning the traversal task that is unassigned and present in the task list, to the AV having the total completion time and the estimated collision count being the lowest, and (iii) removing each traversal task that is assigned from the task list, until either each of the one or more traversal tasks are assigned or until the task list is empty; and generate an optimized traversal task plan for execution of the one or more traversal tasks by the one or more AVs, based on the assignment of each traversal task to each AV.

In yet another aspect, there are provided one or more non-transitory machine-readable information storage mediums comprising one or more instructions which when executed by one or more hardware processors cause: receiving an autonomous vehicle (AV) list having one or more autonomous vehicles (AVs), a task list having one or more traversal tasks to be performed by the one or more AVs, one or more sensors installed in each AV of the AV list, a map of a 3-dimensional (3-D) dynamic environment where each AV to be traversed, and a statistical error model associated with each sensor installed in each AV, wherein each traversal task comprises a predefined source location and a predefined destination location in the 3-D dynamic environment, and the map of the 3-D dynamic environment comprises one or more obstacles and defines one or more environmental attributes associated with each obstacle; configuring a first radius parameter and a second radius parameter, to define a zone type for each AV with respect to each obstacle, from a zone type list having (i) a red zone, (ii) a yellow zone, and (iii) a green zone, based on a distance from each obstacle to each AV; determining (i) an estimated completion time, and (ii) an estimated collision count, for each traversal task with respect to each AV, using (i) the statistical error model associated with each sensor installed in the associated AV, (ii) the one or more obstacles present during completion of associated traversal task, and (iii) the one or more environmental attributes associated with each obstacle; identifying and assigning, a traversal task among the one or more traversal tasks to each AV, based the estimated completion time and the estimated collision count being lowest, and removing each traversal task that is assigned from the task list; determining a total completion time, for each AV, as a summation of the estimated completion time of the each of the one or more traversal tasks assigned to the associated AV; assigning the traversal task that is unassigned and present in the task list, to the AV having the total completion time and the estimated collision count being the lowest, and removing each traversal task that is assigned from the task list; performing (i) determining the total completion time for each AV, (ii) assigning the traversal task that is unassigned and present in the task list, to the AV having the total completion time and the estimated collision count being the lowest, and (iii) removing each traversal task that is assigned from the task list, until either each of the one or more traversal tasks are assigned or until the task list is empty; and generating an optimized traversal task plan for execution of the one or more traversal tasks by the one or more AVs, based on the assignment of each traversal task to each AV.

In an embodiment, the one or more environmental attributes associated with each obstacle are a mean height, a mean breadth, and a mean width with respect to the 3-D dynamic environment.

In an embodiment, the zone type is the red zone for each AV with respect to each obstacle, when the distance from the associated obstacle to the associated AV is within the first radius parameter; the zone type is the yellow zone for each AV with respect to each obstacle, when the distance from the associated obstacle to the associated AV is in between the first radius parameter and the second radius parameter; and the zone type is the green zone for each AV with respect to each obstacle, when the distance from the associated obstacle to the associated AV is beyond the second radius parameter.

In an embodiment, the one or more sensors installed in each AV are used to (i) detect one or more obstacles present in the 3-D dynamic environment for the associated AV, and (ii) measure the distance from each obstacle to the associated AV.

In an embodiment, the statistical error model associated with each sensor comprises one or more of (i) a mean sensing value and (ii) a standard deviation sensing value.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIGS. 3A and 3B illustrates exemplary flow diagrams of a processor-implemented method for optimized assignment of traversal tasks under imperfect sensing of autonomous vehicles, in accordance with some embodiments of the present disclosure.

DETAILED DESCRIPTION

Figure 1:
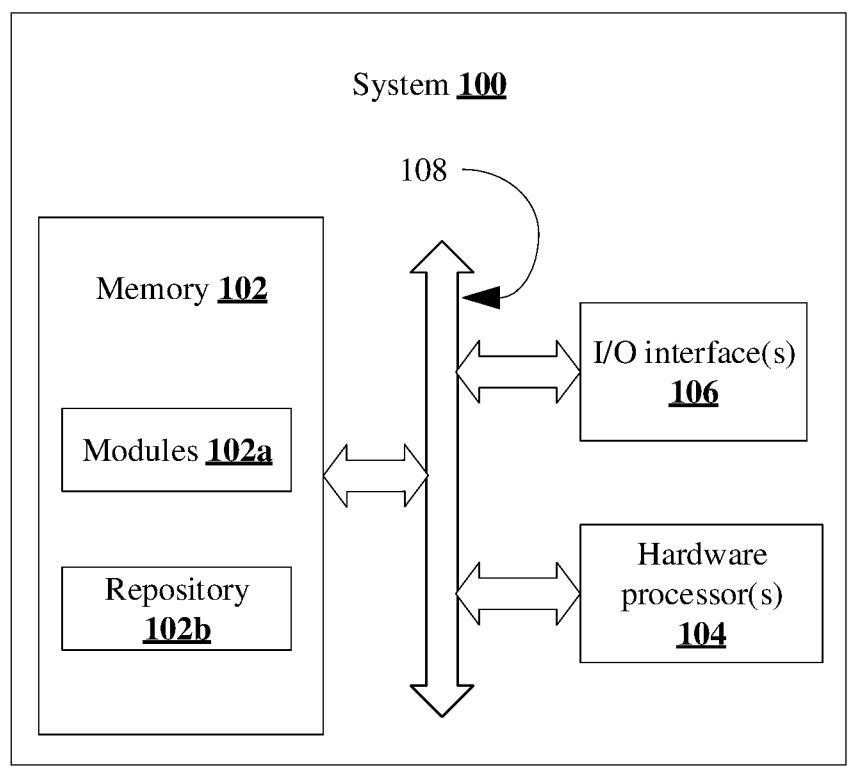
FIG. 1 is an exemplary block diagram of a system for optimized assignment of traversal tasks under imperfect sensing of autonomous vehicles, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The present disclosure solves the technical problems in the art by employing a model called as motion analytics for autonomous vehicle (AV) under error conditions (MAUA-VUE) which provides analytical study of the traversal task of the AV, for optimized assignment of traversal tasks. The proposed model estimates the basic performance metrics such as an expected travel duration and safety estimation such as collision probability on its path, under imperfect sensing.

Referring now to the drawings, and more particularly to FIG. 1 through FIG. 6C, where similar reference characters denote corresponding features consistently throughout the figures, there are shown preferred embodiments and these embodiments are described in the context of the following exemplary systems and/or methods.

FIG. 1 is an exemplary block diagram of a system 100 for optimized assignment of traversal tasks under imperfect sensing of autonomous vehicles, in accordance with some embodiments of the present disclosure. In an embodiment, the system 100 includes or is otherwise in communication with one or more hardware processors 104, communication interface device(s) or input/output (I/O) interface(s) 106, and one or more data storage devices or memory 102 operatively coupled to the one or more hardware processors 104. The one or more hardware processors 104, the memory 102, and the I/O interface(s) 106 may be coupled to a system bus 108 or a similar mechanism.

The I/O interface(s) 106 may include a variety of software and hardware interfaces, for example, a web interface, a graphical user interface, and the like. The I/O interface(s) 106 may include a variety of software and hardware interfaces, for example, interfaces for peripheral device(s), such as a keyboard, a mouse, an external memory, a plurality of sensor devices, a printer and the like. Further, the I/O interface(s) 106 may enable the system 100 to communicate with other devices, such as web servers and external databases.

The I/O interface(s) 106 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface(s) 106 may include one or more ports for connecting a number of computing systems with one another or to another server computer. Further, the I/O interface(s) 106 may include one or more ports for connecting a number of devices to one another or to another server.

The one or more hardware processors 104 may be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In the context of the present disclosure, the expressions 'processors' and 'hardware processors' may be used interchangeably. In an embodiment, the system 100 can be implemented in a variety of computing systems, such as laptop computers, portable computers, notebooks, hand-held devices, workstations, mainframe computers, servers, a network cloud and the like.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102 includes a plurality of modules 102a and a repository 102b for storing data processed, received, and generated by one or more of the plurality of modules 102a. The plurality of modules 102a may include routines, programs, objects, components, data structures, and so on, which perform particular tasks or implement particular abstract data types.

The plurality of modules 102a may include programs or computer-readable instructions or coded instructions that supplement applications or functions performed by the system 100. The plurality of modules 102a may also be used as, signal processor(s), state machine(s), logic circuitries, and/or any other device or component that manipulates signals based on operational instructions. Further, the plurality of modules 102a can be used by hardware, by computer-readable instructions executed by the one or more hardware processors 104, or by a combination thereof. In an embodiment, the plurality of modules 102a can include various sub-modules (not shown in FIG. 1). Further, the memory 102 may include information pertaining to input(s)/output(s) of each step performed by the processor(s) 104 of the system 100 and methods of the present disclosure.

The repository 102b may include a database or a data engine. Further, the repository 102b amongst other things, may serve as a database or includes a plurality of databases for storing the data that is processed, received, or generated as a result of the execution of the plurality of modules 102a. Although the repository 102b is shown internal to the system 100, it will be noted that, in alternate embodiments, the repository 102b can also be implemented external to the system 100, where the repository 102b may be stored within an external database (not shown in FIG. 1) communicatively coupled to the system 100. The data contained within such external database may be periodically updated. For example, data may be added into the external database and/or existing data may be modified and/or non-useful data may be deleted from the external database. In one example, the data may be stored in an external system, such as a Lightweight Directory Access Protocol (LDAP) directory and a Relational Database Management System (RDBMS). In another embodiment, the data stored in the repository 102b may be distributed between the system 100 and the external database.

Figure 2:
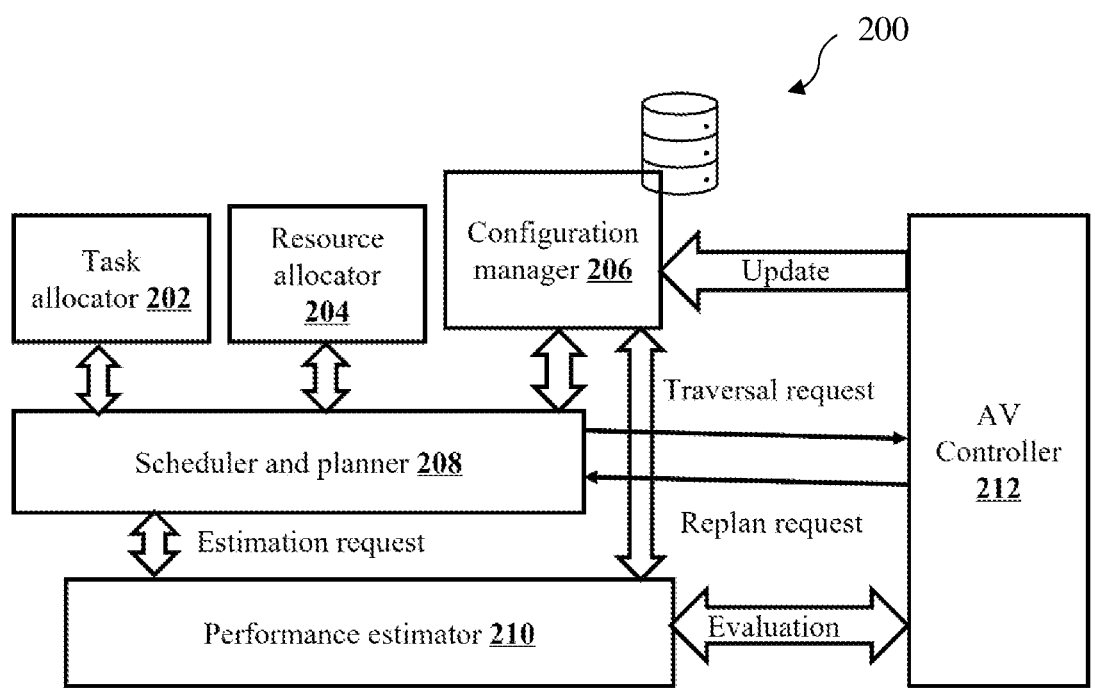
FIG. 2 is an exemplary block diagram illustrating modules of the autonomous vehicle, in accordance with some embodiments of the present disclosure.

FIG. 2 is an exemplary block diagram illustrating modules of an autonomous vehicle 200, in accordance with some embodiments of the present disclosure. As shown in FIG. 2, the modules of the autonomous vehicle 200 includes a task allocator 202, a resource allocator 204, a configuration manager 206, a scheduler and planner 208, a performance estimator 210, and an AV Controller 212.

The task allocator 202 manages tasks to be executed by the autonomous vehicles (AVs) and the resource allocator 204 identifies the resources, i.e., AVs to execute the tasks. In the context of the present disclosure, the tasks mean the traversal tasks denoted as a set of way points. In other words, each traversal task has a source location and a destination location, where the AV has to start traversing from the source location and to reach the destination location. The configuration manager 206 stores various overall equipment related and environment related attributes, which are utilized by other modules for their related computations. The scheduler and planner 208 are responsible for selecting a resource (i.e., AV) corresponding to each task and generate a traversal plan for the AV. The generated plan is then given to the AV controller 212 for execution. The scheduler and planner 208 utilize the performance estimator 210 to evaluate potential plans for its feasibility. The AV controller 212 also uses the performance estimator 210 to estimate task completion time based on present state of the AVs.

The performance estimator 210 evaluates the potential plans depends on various environmental attributes, like obstacle density, mean obstacle radius etc., which are gathered from the configuration manager 206. Such attributes cannot be reliably estimated in an unknown environment. The AV 200 considers user defined initial values for each such attributes and the AV controller refines them based on data gathered through the sensors present in the AV 200 and updates the configuration manager 206 periodically.

From the perspective of providing a service or achieving a task using the AV, several metrics around reliability are of importance. An estimation of completion time of the task is important to the consumer of the service or the end users. The risk involved during the execution of the task is important from the perspective of the service provider. In the present disclosure, the traversal of the AV performing the tasks is analytically modelled and these metrics are derived through the performance estimator 210, in presence of imperfections in sensing which may creep-in due to manufacturing defects or aging. The modelling of the present disclosure is independent of the underlying hardware or software including the path planning algorithm and the obstacle avoidance approach adopted by the AV. Such a generic model enables to provide reasonable accurate metrics for a variety of autonomous vehicles and thereby rendering the overall equipment to be more adaptive.

Referring to FIGS. 3A and 3B, components and functionalities of the system 100 of FIG. 1 and the AV 200 of FIG. 2 are described in accordance with an example embodiment of the present disclosure. For example, FIGS. 3A and 3B illustrates exemplary flow diagrams of a processor-implemented method 300 for optimized assignment of traversal tasks under imperfect sensing of autonomous vehicles, in accordance with some embodiments of the present disclosure. Although steps of the method 300 including process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any practical order. Further, some steps may be performed simultaneously, or some steps may be performed alone or independently.

At step 302 of the method 300, the one or more hardware processors 104 of the system 100 are configured to receive an autonomous vehicle (AV) list having one or more autonomous vehicles (AVs), a task list having one or more traversal tasks to be performed by one or more AVs, one or more sensors installed in each AV of the AV list, a map of a 3-dimensional (3-D) dynamic environment where each AV to be traversed, and a statistical error model associated with each sensor installed in each AV.

Each AV present in the autonomous vehicle (AV) list is a resource and the resource allocator 204 allocates each AV to perform the traversal tasks. Each traversal task present in the task list is maintained by the task allocator 202 which allocates traversal task to each AV for performing and execution. In an embodiment, number of sensors present in each AV may be same and/or different and are used to sense particular data related to the traversal task execution. In an embodiment, the map of the 3-dimensional (3-D) dynamic environment may be an indoor environment or an outdoor environment, or a combination thereof. In the context of the present disclosure, the AV may be a ground autonomous vehicle such a robot, a gladiator, and so on, or may be an aerial autonomous vehicle such as unmanned aerial vehicle (UAV), drone, a hector quad-rotor, and so on. The AV list may include only the ground autonomous vehicles, or the aerial autonomous vehicles or a combination thereof, based on the type of the traversal tasks to be performed.

The traversal task of the present disclosure is a well-defined traversal task, and each traversal task includes a predefined source location and a predefined destination location. The AV has to traversal from the predefined source location to the predefined destination location in the 3-D dynamic environment to perform the corresponding task. For example, a set of drones around a building are traversed to collect images from various sides and angles, and the collected images are then used for detecting fire in the building. The map of the 3-D dynamic environment includes one or more obstacles and one or more environmental attributes associated with each obstacle are defined.

In an embodiment, each sensor present in the AV may be defined to perform specific task. For example, a temperature sensor is used to collect a temperature around the environment, a pressure sensor is used to collect a pressure around the environment, an image sensor is used to collect images of the target object around the environment, and so on. Hence the type of the sensors depends on the nature of the task and includes but are not limited to the temperature sensor, the pressure sensor, the image sensor, a video sensor, and a proximity sensor. While performing the traversal task, the one or more sensors installed in each AV are used to detect one or more obstacles present in the 3-D dynamic environment for the associated AV, and measure the distance from each obstacle to the associated AV.

The statistical error model associated with each sensor includes one or more of (i) a mean sensing value and (ii) a standard deviation sensing value. In an embodiment, the mean sensing value and the standard deviation sensing value may differ from one environment to another environment, based on age of each sensor, and may be defined by the manufacturer with different specifications. The one or more environmental attributes associated with each obstacle are a mean height of the obstacle, a mean breadth of the obstacle, and a mean width of the obstacle with respect to the 3-D dynamic environment. The environmental attributes associated with each obstacle are helpful for avoidance of such obstacles by the AV during the traversal task.

At step 304 of the method 300, the one or more hardware processors 104 of the system 100 configure a first radius parameter and a second radius parameter for each AV. The first radius parameter and the second radius parameter are used to define a zone type for each AV with respect to each obstacle. The zone type is defined from a zone type list including (i) a red zone, (ii) a yellow zone, and (iii) a green zone, based on a distance from each obstacle to each AV.

The zone type is defined as the red zone for the AV with respect to the obstacle, when the distance from the associated obstacle to the associated AV is within the first radius parameter. The zone type is defined as the yellow zone for the AV with respect to the obstacle, when the distance from the associated obstacle to the associated AV is in between the first radius parameter and the second radius parameter. Similarly, the zone type is defined as the green zone for the AV with respect to the obstacle, when the distance from the associated obstacle to the associated AV is beyond the second radius parameter.

Consider the AV which is travelling from a source location S to a destination D, following a planned path. The path is approximated as piecewise linear path segments and are denoted as an ordered set of n points $P=\langle P_0, P_1, \ldots, P_n \rangle$, demarcating the terminal points of these segments, such that $\overline{P_i, P_{i+1}}$: $0 \leq i \leq n$ is a linear path segment, where each point $P_i=(x_i, y_i, z_i)$ is represented in a 3-D co-ordinate system and also $P_0=S$, and $P_n=D$.

Figure 4:
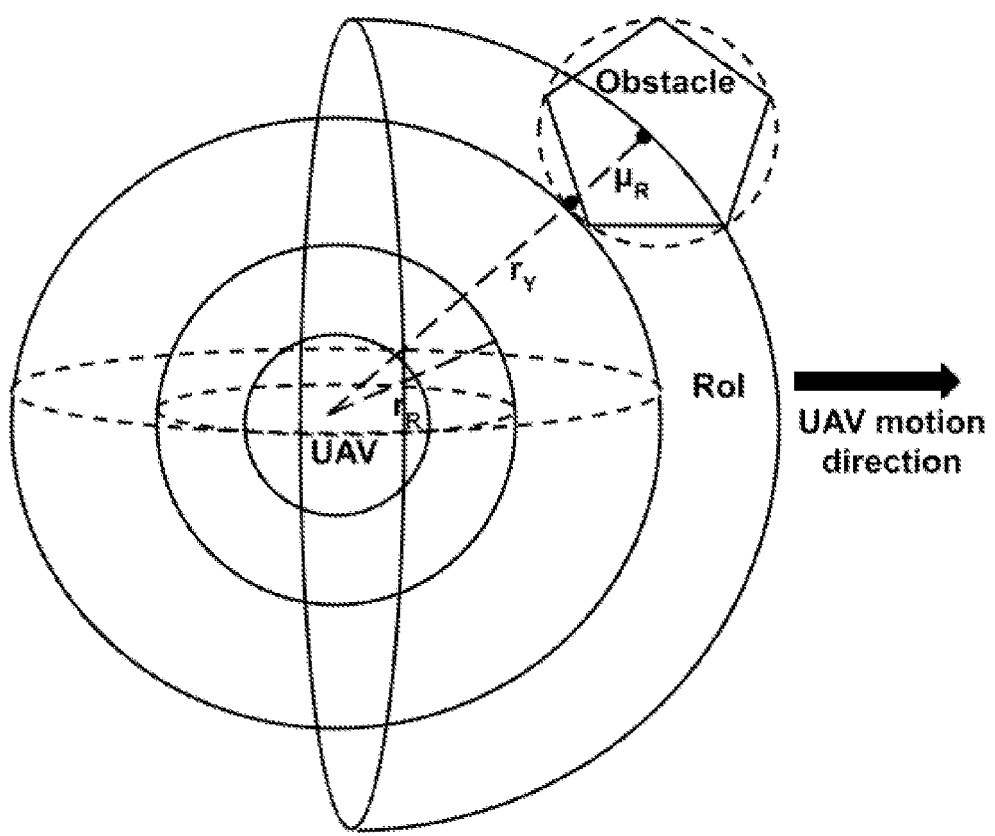
FIG. 4 is a diagram showing a red zone, a yellow zone, and a green zone, defined in a region of interest (ROI) in the part of the AV, in accordance with some embodiments of the present disclosure.

As the AV moves along the planned path, it also uses sensed data to detect any obstacle on its path and triggers avoidance algorithm to move around the obstacle and re-align with its planned path. The sensor-based collision detection and avoidance happens in sense→detect→respond duty cycles, continuously. The AV's perception of obstacles in its environment is in reference to red-yellow-green zones based on their distance from the AV. FIG. 4 is a diagram showing the red zone, the yellow zone, and the green zone, defined in a region of interest (ROI) in the part of AV.

FIG. 4 is a diagram showing the red zone, the yellow zone, and the green zone, defined in a region of interest (ROI) in the part of AV, in accordance with some embodiments of the present disclosure. As shown in FIG. 4, the spherical zone of radius $r_R$ and centered at the AV is defined as the red zone denoting collision or imminent collision. The obstacles within the annular region in between outer radius $r_Y$ and the inner radius $r_R$ ($< r_Y$) is defined as the yellow zone denoting high risk zone, and the rest of the space is defined to be green zone or safe zone.

In an embodiment, the first radius parameter is in general is defined as the distance as that of twice the size of the AV. An exemplary value of the first radius parameter is 1.5 meters. In an embodiment, the second radius parameter is in general is defined as the distance based on both the size of the AV and the distance required for AV to take a turn to avoid the collision or obstacle. An exemplary value of the second radius parameter is 2 meters.

At step 306 of the method 300, the one or more hardware processors 104 of the system 100 are configured to determine (i) an estimated completion time, and (ii) an estimated collision count, for each traversal task with respect to each AV. The estimated completion time is the time required to complete the traversal task for the given AV. The estimated collision count is the number of collisions likely to occur due to the obstacles in the traversal path for the AV, while performing the traversal task. The estimated completion time and the estimated collision count are combinedly referred as performance metrics which are determined by the performance estimator 210, continuously at each regular time interval.

The performance metrics i.e., the estimated completion time and the estimated collision count are determined using (i) the statistical error model associated with each sensor installed in the associated AV received at step 302 of the method 300, (ii) the one or more obstacles present during completion of associated traversal task, defined in the map of the 3-D environment at step 302 of the method 300, and (iii) the one or more environmental attributes associated with each obstacle received at step 302 of the method 300.

Figure 5:
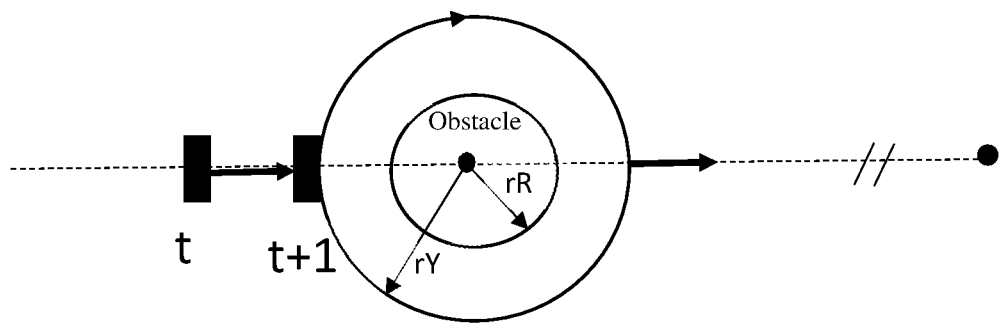
FIG. 5 is a diagram showing a behavior of the AV traversal around the obstacle in the yellow zone, in accordance with some embodiments of the present disclosure.

Equations or formula (e) for determining the estimated completion time and the estimated collision count for each AV with respect to each traversal task, are derived as follows under imperfect sensing of the sensors installed in each AV. Consider the length the traversal planned path segment be d. It is assumed that the AV travels with an average velocity $v_x$ while on planned path. The AV triggers obstacle avoidance maneuver when it detects an obstacle within its yellow zone and slows down to $v_m$ as it performs avoidance maneuver. FIG. 5 is a diagram showing a behavior of the AV traversal around the obstacle in the yellow zone, in accordance with some embodiments of the present disclosure. As shown in FIG. 5, the AV traversal around the obstacle is shown as thick black path, while the dotted line depicts the planned path.

Consider the time to be discrete and let $\tau$ be the time quanta and is equal to the duty cycle. For simplicity, consider $\tau=1$. In general, the time estimates derived can trivially be scaled for generic values of t. At each discrete time instance t, denote $d_t$ to be the estimated distance to be travelled. Let p represent the probability of encountering the obstacle on the planned path. The obstacle avoidance maneuver affects an additional distance to travel due to the difference of travelling along the circular arc around the obstacle, instead of the straight planned path along the diameter as depicted in FIG. 5. The difference is $\Delta=(\pi-2)R$, where R is the estimated radius of the yellow region around the obstacle. Let, $\mu_R$ is the mean obstacle radius, then $R=r_Y+\mu_R$. Therefore, a recurrence can be developed as: $d_{t+1}=d_t-v_x+P\kappa\Delta \Rightarrow d_t-d_{t+1}=v_x-P\kappa\Delta$, where $\kappa=v_x/v_m$ and the factor is used to scale up addition distance and cater for velocity difference during obstacle avoidance maneuver. Summing over both sides, $$\sum_0^T (d_t - d_{t+1}) = \sum_0^T (v_x - P\kappa\Delta) \Rightarrow d_0 - d_T =$$

$$d = T(v_x - P\kappa\Delta) \Rightarrow T = \frac{d}{v_x - P\kappa\Delta} = \frac{d}{v_x - P\kappa(\pi - 2)R}$$

where, T is the estimated traversal time of the planned path segment.

Now, the probability, p, presence of obstacle on the path is estimated. Consider $\mu_O$ be the mean of density of distribution of centroids of obstacles. The value of p is evaluated as $p=V\mu_O$, where V is the volume of the region of interest (RoI) to the AV (As shown in FIG. 4). When the AV is in forward motion, the RoI is the surface area of the front hemisphere with radius $R=r_Y+\mu_R$ centered at the AV and is equal to $2\pi R^2$. It is assumed that the AV traverses at a constant speed $v_x$, the RoI $V=v_x 2\pi R^2$. Therefore, the probability of obstacles in the new sweep volume, $p=V\mu_O=v_x 2\pi R^2 \mu_O$. So, the above expected value for travel time transforms into the following form, $$\mathbb{E}[T] = \frac{d}{v_x - 2\pi R^2 v_x \mu_O \kappa(\pi - 2)R} \quad (1)$$

$$= \frac{d}{v_x(1 - 2\kappa\mu_o\pi(\pi - 2)R^3)}$$

where $\mathbb{E}[T]$ is the estimated travel time for AV under perfect sensing condition.

However, in the practical scenario, the sensor readings are not always accurate. The simplest type of error in sensors called as single sensor independent error is considered for deriving the estimated travel time for AV under imperfect sensing condition. In this type of error, the single sensor is considered to be faulty. Further, the error in the sensor reading of the faulty sensor is assumed as does not affect the sensor readings from other sensors present in the AV. Therefore, the effect of this type of sensor error is an erroneous actuation of one or more actuators. For example, in the AV, the camera sensor readings play a vital role in the propeller motor actuation. However, it may not affect the readings of other sensors like GPS sensor, etc.

In the context of the present disclosure, monitoring the effect of error in distance sensors is considered. The AV tends to collide with an obstacle in its planned path whenever the error, $\varepsilon$, in distance sensor is greater than $b_Y$ where $b_Y = r_Y - r_R$. Therefore, the probability of not detecting the obstacle in yellow zone and the obstacle is in the yellow zone can be evaluated as $Pr(\overline{D_y}|O_y) = F_\varepsilon(\varepsilon > b_Y) = 1 - F_\varepsilon(b_Y)$, where, $F_\varepsilon$ is the Cumulative Distribution Function (CDF) of the error distribution associated with the sensor. The probability of obstacle in the yellow zone is $Pr(O_y) = F_O(\frac{2}{3}\pi(R^3 - (r_Y^3)))$. Therefore, the probability that the distance sensor fails to detect an obstacle in the yellow zone can be evaluated as, $$Pr(\overline{D_y}|O_y) = \frac{Pr(D_yO_y)}{Pr(O_y)} = \frac{1 - F_\varepsilon(b_Y)}{F_o(\frac{2}{3}\pi(R^3 - (r_Y^3)))}$$

So, $\Delta$, the additional path to be traversed by the AV to transit from the yellow zone to green zone is:

$$\Delta = (1 - Pr(\overline{D_y}|O_y))(\pi - 2)R + Pr(\overline{D_y}|O_y)((\pi - 2)R + b_Y) \quad (2)$$

$$\Delta = (\pi - 2)R + \frac{b_Y(1 - F_\varepsilon(b_Y))}{F_o(\frac{2}{3}\pi(R^3 - (r_Y^3)))}$$

Thus, the expected travel time ($\mathbb{E}[T]$) for each UAV and the estimated collision count estimation ($\mathbb{E}[CC]$) for each UAV under imperfect condition are mathematically represented as in equation 3 and equation 4 respectively:

$$\mathbb{E}[T] = \frac{d}{v_x - 2\pi R^2 v_x \mu_o \kappa \Delta} \quad (3)$$

$$\mathbb{E}[CC] = v_x(\pi\mu_R^2 \mathbb{E}[T])\mu_o Pr(\overline{D_y}|O_y) \quad (4)$$

Initially, all the parameters defined in the present disclosure are manually initialized in the configuration manager 206. During the traversal, these parameters are automatically re-evaluated and updated at regular intervals by the configuration manager 206.

At step 308 of the method 300, the one or more hardware processors 104 of the system 100 are configured to identify the traversal task among the one or more traversal tasks to each AV, that has the lowest estimated completion time and the lowest estimated collision. The identified traversal tasks are then assigned to the corresponding one or more AVs, and such assigned tasks are removed from the task list.

If the task list is not empty after the step 308 of the method 300, then at step 310 of the method 300, the one or more hardware processors 104 of the system 100 are configured to determine a total completion time, for each AV based on the assigned traversal tasks at the previous step. Hence, the total completion time for each AV is determined by summation of the estimated completion time of the each of the one or more traversal tasks assigned to the associated AV.

At step 312 of the method 300, the one or more hardware processors 104 of the system 100 are configured to assign the traversal task that is unassigned in the previous steps and present in the task list, to the AV, where the traversal task having the lowest total completion time and the lowest estimated collision count. The assigned traversal tasks in this step are also removed from the task list.

If the task list is still not empty after the step 308 of the method 300 and after the step 312 of the method 300, then at step 314 of the method 300, the one or more hardware processors 104 of the system 100 are configured to perform (i) determining the total completion time for each AV as described at step 310, (ii) assigning the traversal task that is unassigned and present in the task list, to the AV having the total completion time and the estimated collision count being the lowest as described at step 312. The assigned traversal tasks in this step are also removed from the task list. The performed at this step 314 is continued until either each of the one or more traversal tasks are assigned or until the task list is empty.

At step 316 of the method 300, the one or more hardware processors 104 of the system 100 are configured to generate an optimized traversal task plan for execution of the one or more traversal tasks by the one or more AVs, based on the assignment of each traversal task to each AV done at steps 308, 312 and 314 of the method 300. Sometimes it is possible that some of the traversal tasks during the actual execution may be aborted in between or may be partially completed. Such traversal tasks are also again moved to the task list for the re-assignment based on the performance metrics as explained in the previous steps.

The embodiments of present disclosure herein address unresolved problem of optimized assignment of traversal tasks under imperfect sensing of autonomous vehicles, with the use of the analytical model. The analytical model estimates the basic performance metrics such as an expected travel duration and safety estimation such as collision probability on its path, under imperfect sensing. Since, the present disclosure considers the error sensing model of each sensor with the imperfect sensing, the assignment and scheduling of the task is optimum and effective during actual execution of the tasks.

The analytical model as described herein is integrated with the performance estimator, which tracks, predicts, and alerts on any major deviations from its intended performance of safety parameters. The modelling of the present disclosure is independent of the underlying hardware or software including the path planning algorithm and the obstacle avoidance approach adopted by the AV. Such a generic model enables to provide reasonable accurate metrics for a variety of autonomous vehicles and thereby rendering the overall equipment to be more adaptive.

Example Scenario

The present disclosure is compared with empirical results from Gazebo simulation system. The instance of the analytical model corresponding to the simulated environment is described below.

Model Instance for Experimental Environment

The obstacles are assumed to be randomly distributed in the arena follows gamma distribution with parameters (k, θ). Therefore, $\mu_O = k\theta$. Also, k, θ≥0. Since obstacles solid objects and cannot share their space occupancy, the gamma distribution is not a flat distribution, and k≥1. Since $\mu_O$ is represented as the density of obstacle in the arena, the additional constraint $0 \leq \mu_O \leq 1$. For the gamma distribution, the CDF is expressed as $F_0(x) = (1/\Gamma(k))\gamma(k, x/\theta)$.

Also, the errors are assumed to be induced in the readings are normally distributed about 0 i.e., follows $N(\mu_O=0, \sigma_\varepsilon^2)$. For the normal distribution, the CDF is expressed as $F_e(x) = \frac{1}{2}(1 + er\ f(x/(\sigma_\varepsilon\sqrt{2})))$.

The conditional probability of detection of failure can be computed as follows, where $\theta = \mu_O / k$ $$Pr(\overline{D_y} \mid O_y) = \frac{\Gamma(k)}{2} \frac{1 - er\ f(b_Y/(\sigma_\varepsilon\sqrt{2})}{\gamma(k, k(2\pi/3)(R^3 - r_Y^3)/\mu_O} \quad (5)$$

With this by using equation 4, the expected travel time and expected collision count can be computed using the equation 3 and 4 respectively.

B. Experimental Setup

The simulations are performed with hector quad-rotor in Gazebo with ROS-kinetic binding. The hector quad-rotor model along-with the sensor models are available in open-source repository. The AV is deployed in an area of 125 m-cube area. Different number of static obstacles of varied size is randomly placed in the simulated area. The vehicle uses a GPU ray sensor to detect obstacles in path. The radius of the yellow zone is assumed to be 0.5 m and the vehicle is assumed to fly at an altitude of 1 m. The vehicle flies with an average uniform speed of 0.57 m/s when no obstacles are detected. During obstacle avoidance maneuver, it flies at a uniform speed of 0.13 m/s. All experiments were conducted 10 times and the average values are reported

C. Results and Discussion

Figure 6A:
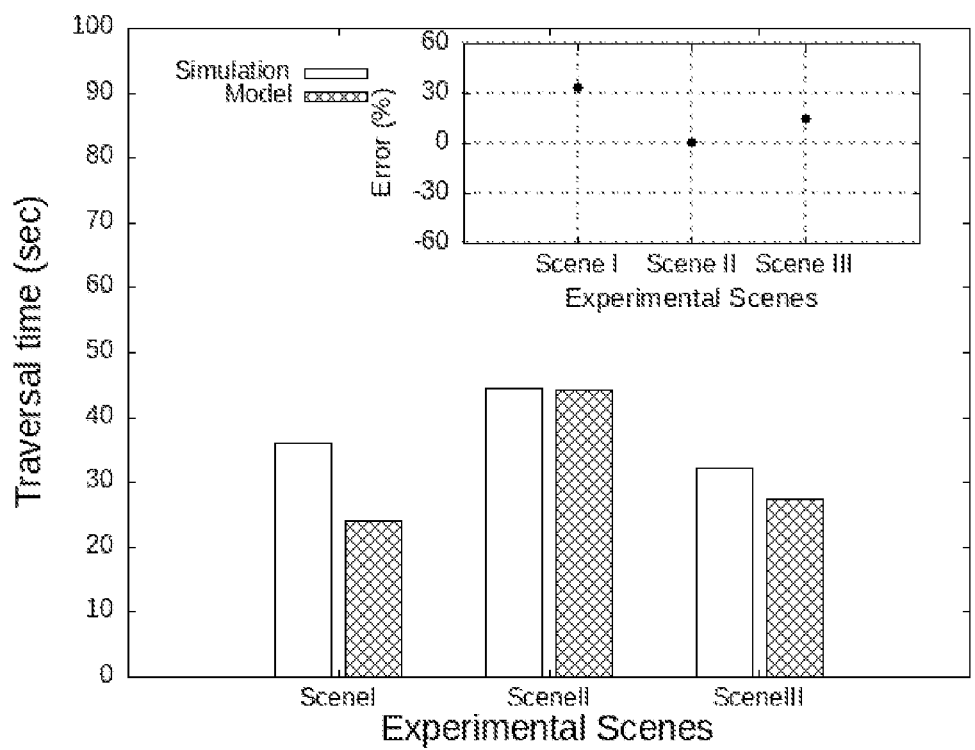
FIG. 6A is a graph showing a comparison of an estimated traversal time of a hector quad-rotor against a travel time observed in a simulated environment with varying obstacle number and size under perfect sensing, in accordance with some embodiments of the present disclosure.

In the first experiment, the performance of the AVs was observed, with non-faulty sensor under three scenarios. In scene I, 1 obstacle of dimension 1 m-cube, in Scene II, 5 homogeneous obstacles, each of dimension 0.5 m×0.5 m×1 m, and in Scene III, 10 homogeneous obstacles, each of dimension 0.2 m-cube are simulated. The hector quad-rotor was assigned with the task to travel a distance of 9.89 m. FIG. 6A is a graph showing a comparison of an estimated traversal time of a hector quad-rotor against a travel time observed in a simulated environment with varying obstacle number and size under perfect sensing, in accordance with some embodiments of the present disclosure. As shown in FIG. 6A, the inset figure shows difference between the empirical travel time and the analytical estimation in per-centile. Also, the actual fly-time is slightly higher than the expected traversal time according to the present disclosure (model). This is due to the approximations made while developing the proposed disclosure. The largest difference is for Scene-I with a single large obstacle. The AV needed to backtrack several times to keep away from the obstacle as it searched for the path around the obstacle and this behavior resulted in longer time in avoidance.

In the second experiment, traversal times were compared by varying obstacle sizes while keeping the number of obstacles constant at 12 counts. Each obstacle was of height 1 m. The length and breadth of the obstacles varied between 0.4 m to 1 m. The obstacles were randomly placed in the simulated area, while the hector quad-rotor traveled a distance of 19.89 m.

Figure 6B:
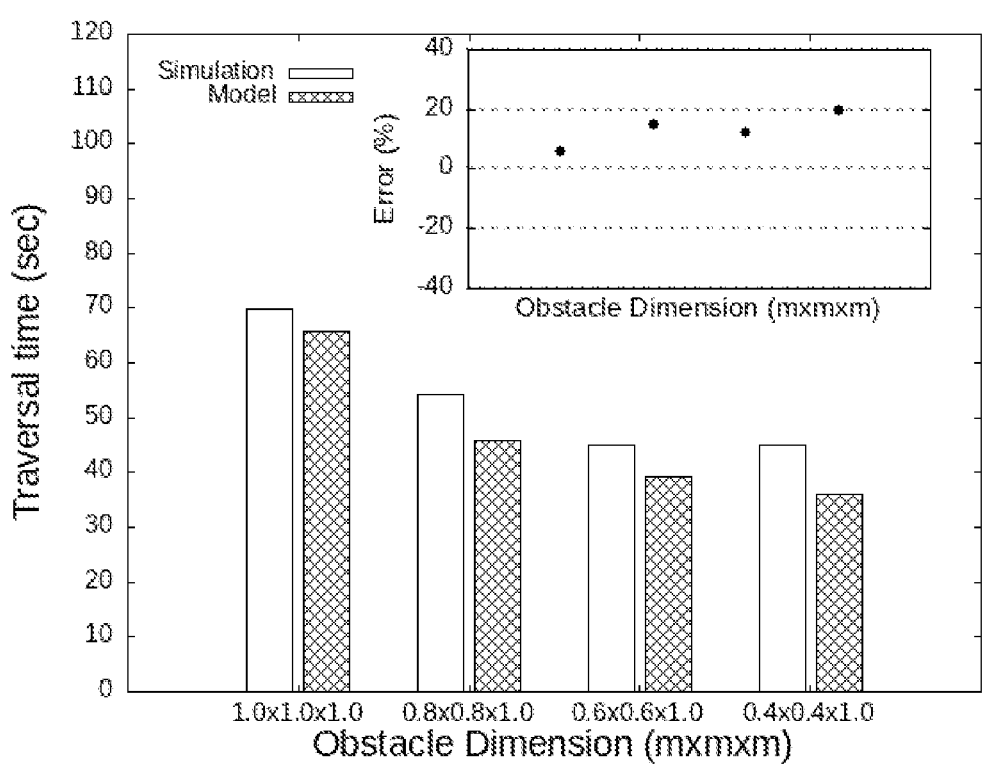
FIG. 6B is a graph showing a comparison of the estimated traversal times of the hector quad-rotor against the travel time observed in the simulated environment, with varying obstacle size and constant number of obstacles, under perfect sensing, in accordance with some embodiments of the present disclosure.

FIG. 6B is a graph showing a comparison of the estimated traversal times of the hector quad-rotor against the travel time observed in the simulated environment, with varying obstacle size and constant number of obstacles, under perfect sensing, in accordance with some embodiments of the present disclosure. As shown in FIG. 6B, the simulation results closely conform with the expected travel times. As expected, the traversal time decreases with decrease in the obstacle size as it required lesser avoidance maneuvering time.

With Sensing Imperfections

The third set of experiments were conducted to validate the present disclosure under sensing imperfections. 12 obstacles were simulated with each of dimension 0.4 m×0.4 m×1 m. The hector quad-rotor was assigned with the task to traverse a distance of 19.79 m. Two scenarios were evaluated. In Scene I, GPU ray sensor was injected with Gaussian error N (0.5, 0.5) and in Scene II, N (1.0, 0.5). The average collision count is approximately 0 and the same was predicted by the present disclosure.

Figure 6C:
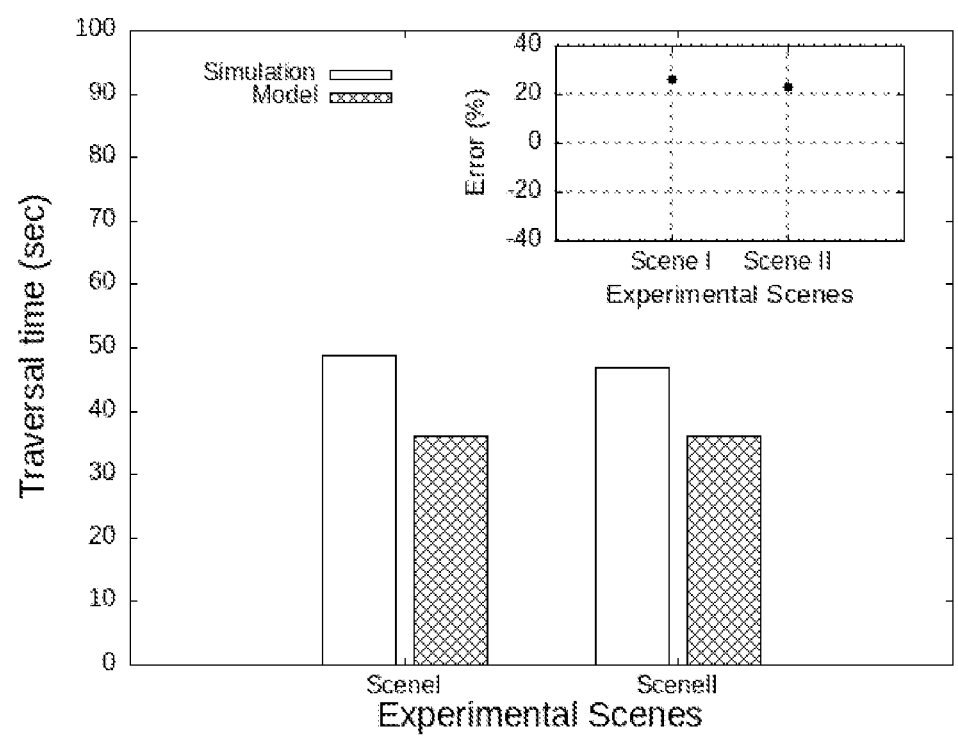
FIG. 6C is a graph showing a comparison of the estimated traversal times, under imperfect sensing, in accordance with some embodiments of the present disclosure.

FIG. 6C is a graph showing a comparison of the estimated traversal times, under imperfect sensing, in accordance with some embodiments of the present disclosure. As shown in FIG. 6C, the observed traversal time is higher than the predicted one from the present disclosure. This is due to failure of the AV to accurately detect its distance from the obstacle and backtracking often resulting in longer time to avoid obstacles.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method, comprising the steps of:
    receiving, via one or more hardware processors, an autonomous vehicle (AV) list having one or more autonomous vehicles (AVs), a task list having one or more traversal tasks to be performed by the one or more AVs, one or more sensors installed in each AV of the AV list, a map of a 3-dimensional (3-D) dynamic environment where each AV to be traversed, and a statistical error model associated with each sensor installed in each AV, wherein each traversal task comprises a predefined source location and a predefined destination location in the 3-D dynamic environment, and the map of the 3-D dynamic environment comprises one or more obstacles and defines one or more environmental attributes associated with each obstacle;
    configuring, via the one or more hardware processors, a first radius parameter and a second radius parameter, to define a zone type for each AV with respect to each obstacle, from a zone type list having (i) a red zone, (ii) a yellow zone, and (iii) a green zone, based on a distance from each obstacle to each AV;
    determining, via the one or more hardware processors, (i) an estimated completion time, and (ii) an estimated collision count, for each traversal task with respect to each AV, using (i) the statistical error model associated with each sensor installed in the associated AV, (ii) the one or more obstacles present during completion of associated traversal task, and (iii) the one or more environmental attributes associated with each obstacle;
    identifying and assigning, via the one or more hardware processors, a traversal task among the one or more traversal tasks to each AV, based the estimated completion time and the estimated collision count being lowest, and removing each traversal task that is assigned from the task list;
    determining, via the one or more hardware processors, a total completion time, for each AV, as a summation of the estimated completion time of the each of the one or more traversal tasks assigned to the associated AV;
    assigning, via the one or more hardware processors, the traversal task that is unassigned and present in the task list, to the AV having the total completion time and the estimated collision count being the lowest, and removing each traversal task that is assigned from the task list; and
    performing, via the one or more hardware processors, (i) determining the total completion time for each AV, (ii) assigning the traversal task that is unassigned and present in the task list, to the AV having the total completion time and the estimated collision count being the lowest, and (iii) removing each traversal task that is assigned from the task list, until either each of the one or more traversal tasks are assigned or until the task list is empty.

2. The processor-implemented method of claim 1, further comprising:
    generating, via the one or more hardware processors, an optimized traversal task plan for execution of the one or more traversal tasks by the one or more AVs, based on the assignment of each traversal task to each AV.

3. The processor-implemented method of claim 1, wherein the one or more environmental attributes associated with each obstacle are a mean height, a mean breadth, and a mean width with respect to the 3-D dynamic environment.

4. The processor-implemented method of claim 1, wherein:
    (i) the zone type is the red zone for each AV with respect to each obstacle, when the distance from the associated obstacle to the associated AV is within the first radius parameter;

(ii) the zone type is the yellow zone for each AV with respect to each obstacle, when the distance from the associated obstacle to the associated AV is in between the first radius parameter and the second radius parameter; and (iii) the zone type is the green zone for each AV with respect to each obstacle, when the distance from the associated obstacle to the associated AV is beyond the second radius parameter.

5. The processor-implemented method of claim 1, wherein the one or more sensors installed in each AV are used to (i) detect one or more obstacles present in the 3-D dynamic environment for the associated AV, and (ii) measure the distance from each obstacle to the associated AV.

6. The processor-implemented method of claim 1, wherein the statistical error model associated with each sensor comprises one or more of (i) a mean sensing value and (ii) a standard deviation sensing value.

7. A system comprising:
a memory storing instructions;
one or more input/output (I/O) interfaces; and
one or more hardware processors coupled to the memory via the one or more I/O interfaces, wherein the one or more hardware processors are configured by the instructions to:
receive an autonomous vehicle (AV) list having one or more autonomous vehicles (AVs), a task list having one or more traversal tasks to be performed by the one or more AVs, one or more sensors installed in each AV of the AV list, a map of a 3-dimensional (3-D) dynamic environment where each AV to be traversed, and a statistical error model associated with each sensor installed in each AV, wherein each traversal task comprises a predefined source location and a predefined destination location in the 3-D dynamic environment, and the map of the 3-D dynamic environment comprises one or more obstacles and defines one or more environmental attributes associated with each obstacle;
configure a first radius parameter and a second radius parameter, to define a zone type for each AV with respect to each obstacle, from a zone type list having (i) a red zone, (ii) a yellow zone, and (iii) a green zone, based on a distance from each obstacle to each AV;
determine (i) an estimated completion time, and (ii) an estimated collision count, for each traversal task with respect to each AV, using (i) the statistical error model associated with each sensor installed in the associated AV, (ii) the one or more obstacles present during completion of associated traversal task, and (iii) the one or more environmental attributes associated with each obstacle;
identify and assign, via the one or more hardware processors, a traversal task among the one or more traversal tasks to each AV, based the estimated completion time and the estimated collision count being lowest, and removing each traversal task that is assigned from the task list;
determine a total completion time, for each AV, as a summation of the estimated completion time of the each of the one or more traversal tasks assigned to the associated AV;
assign the traversal task that is unassigned and present in the task list, to the AV having the total completion time and the estimated collision count being the lowest, and removing each traversal task that is assigned from the task list; and perform (i) determining the total completion time for each AV, (ii) assigning the traversal task that is unassigned and present in the task list, to the AV having the total completion time and the estimated collision count being the lowest, and (iii) removing each traversal task that is assigned from the task list, until either each of the one or more traversal tasks are assigned or until the task list is empty.

8. The system of claim 7, wherein the one or more hardware processors are further configured to:
generate an optimized traversal task plan for execution of the one or more traversal tasks by the one or more AVs, based on the assignment of each traversal task to each AV.

9. The system of claim 7, wherein the one or more environmental attributes associated with each obstacle are a mean height, a mean breadth, and a mean width with respect to the 3-D dynamic environment.

10. The system of claim 7, wherein:
(i) the zone type is the red zone for each AV with respect to each obstacle, when the distance from the associated obstacle to the associated AV is within the first radius parameter;
(ii) the zone type is the yellow zone for each AV with respect to each obstacle, when the distance from the associated obstacle to the associated AV is in between the first radius parameter and the second radius parameter; and
(iii) the zone type is the green zone for each AV with respect to each obstacle, when the distance from the associated obstacle to the associated AV is beyond the second radius parameter.

11. The system of claim 7, wherein the one or more hardware processors are configured to (i) detect one or more obstacles present in the 3-D dynamic environment for the associated AV, and (ii) measure the distance from each obstacle to the associated AV, by the one or more sensors installed in each AV.

12. The system of claim 7, wherein the statistical error model associated with each sensor comprises one or more of (i) a mean sensing value and (ii) a standard deviation sensing value.

13. One or more non-transitory machine-readable information storage mediums comprising one or more instructions which when executed by one or more hardware processors cause:
receiving, an autonomous vehicle (AV) list having one or more autonomous vehicles (AVs), a task list having one or more traversal tasks to be performed by the one or more AVs, one or more sensors installed in each AV of the AV list, a map of a 3-dimensional dynamic environment where each AV to be traversed, and a statistical error model associated with each sensor installed in each AV, wherein each traversal task comprises a predefined source location and a predefined destination location in the 3-D dynamic environment, and the map of the 3-D dynamic environment comprises one or more obstacles and defines one or more environmental attributes associated with each obstacle;
configuring, a first radius parameter and a second radius parameter, to define a zone type for each AV with respect to each obstacle, from a zone type list having (i) a red zone, (ii) a yellow zone, and (iii) a green zone, based on a distance from each obstacle to each AV;
determining, (i) an estimated completion time, and (ii) an estimated collision count, for each traversal task with respect to each AV, using (i) the statistical error model associated with each sensor installed in the associated AV, (ii) the one or more obstacles present during completion of associated traversal task, and (iii) the one or more environmental attributes associated with each obstacle;

identifying and assigning, a traversal task among the one or more traversal tasks to each AV, based the estimated completion time and the estimated collision count being lowest, and removing each traversal task that is assigned from the task list;

determining, a total completion time, for each AV, as a summation of the estimated completion time of the each of the one or more traversal tasks assigned to the associated AV;

assigning, the traversal task that is unassigned and present in the task list, to the AV having the total completion time and the estimated collision count being the lowest, and removing each traversal task that is assigned from the task list; and performing, (i) determining the total completion time for each AV, (ii) assigning the traversal task that is unassigned and present in the task list, to the AV having the total completion time and the estimated collision count being the lowest, and (iii) removing each traversal task that is assigned from the task list, until either each of the one or more traversal tasks are assigned or until the task list is empty.

14. The one or more non-transitory machine-readable information storage mediums of claim 13, further comprising:

generating, an optimized traversal task plan for execution of the one or more traversal tasks by the one or more AVs, based on the assignment of each traversal task to each AV.

15. The one or more non-transitory machine-readable information storage mediums of claim 13, wherein the one or more environmental attributes associated with each obstacle are a mean height, a mean breadth, and a mean width with respect to the 3-D dynamic environment.

16. The one or more non-transitory machine-readable information storage mediums of claim 13, wherein:

(i) the zone type is the red zone for each AV with respect to each obstacle, when the distance from the associated obstacle to the associated AV is within the first radius parameter;

(ii) the zone type is the yellow zone for each AV with respect to each obstacle, when the distance from the associated obstacle to the associated AV is in between the first radius parameter and the second radius parameter; and (iii) the zone type is the green zone for each AV with respect to each obstacle, when the distance from the associated obstacle to the associated AV is beyond the second radius parameter.

17. The one or more non-transitory machine-readable information storage mediums of claim 13, wherein the one or more sensors installed in each AV are used to (i) detect one or more obstacles present in the 3-D dynamic environment for the associated AV, and (ii) measure the distance from each obstacle to the associated AV.

18. The one or more non-transitory machine-readable information storage mediums of claim 13, wherein the statistical error model associated with each sensor comprises one or more of (i) a mean sensing value and (ii) a standard deviation sensing value.

* * * * *